US011745897B2

(12) United States Patent
Brown et al.

(10) Patent No.: US 11,745,897 B2
(45) Date of Patent: Sep. 5, 2023

(54) METHODS AND APPARATUS TO RECOVER UNMANNED AERIAL VEHICLES (UAVS) WITH KITES

(71) Applicant: Insitu, Inc., Bingen, WA (US)

(72) Inventors: Benjamin T. Brown, Bingen, WA (US); Alice Fockele, Bingen, WA (US); Kelly A. Comstock, Bingen, WA (US); John Wong, Klickitat, WA (US); Jacob Allen, Bingen, WA (US); Daniel L. Shaw, White Salmon, WA (US); Jesse D. Kiewit, Bingen, WA (US)

(73) Assignee: Insitu, Inc., Bingen, WA (US)

( * ) Notice: Subject to any disclaimer, the term of this patent is extended or adjusted under 35 U.S.C. 154(b) by 209 days.

(21) Appl. No.: 16/707,971

(22) Filed: Dec. 9, 2019

(65) Prior Publication Data

US 2021/0171216 A1 Jun. 10, 2021

(51) Int. Cl.
*B64F 1/02* (2006.01)
*B64U 70/30* (2023.01)
*G05D 1/10* (2006.01)

(52) U.S. Cl.
CPC .......... *B64F 1/0295* (2020.01); *G05D 1/105* (2013.01); *B64U 70/30* (2023.01)

(58) Field of Classification Search
CPC .............. B64F 1/0295; B64F 1/0297; B64C 2201/182; B64C 31/06; B64C 2031/065; B64D 17/343; B64D 17/346; B64U 70/30
See application file for complete search history.

(56) References Cited

U.S. PATENT DOCUMENTS

| 2,669,403 | A | 2/1954 | McKay |
| 4,753,400 | A | 6/1988 | Reuter et al. |
| 4,842,222 | A | 6/1989 | Baird |
| 6,264,140 | B1 | 7/2001 | McGeer et al. |
| 6,874,729 | B1 | 4/2005 | McDonnell |
| 7,097,137 | B2 | 8/2006 | McDonnell |
| 10,458,757 | B1 * | 10/2019 | Kearney-Fischer .................. B64C 39/024 |
| 10,640,233 | B2 | 5/2020 | Miller et al. |
| 11,008,101 | B2 | 5/2021 | Miller et al. |
| 11,142,339 | B2 | 10/2021 | Dennis et al. |

(Continued)

FOREIGN PATENT DOCUMENTS

| EP | 3564124 | 11/2019 | |
| WO | WO-9715490 A1 * | 5/1997 | .......... B63H 9/0685 |

(Continued)

OTHER PUBLICATIONS

European Patent Office, "Extended European Search Report," issued in connection with European Patent Application No. 20212007.7, dated May 4, 2021, 9 pages.

(Continued)

*Primary Examiner* — Timothy D Collins
*Assistant Examiner* — Terri L Filosi
(74) *Attorney, Agent, or Firm* — HANLEY, FLIGHT & ZIMMERMAN (57) ABSTRACT

Methods and apparatus to recover unmanned aerial vehicles (UAVs) with kites are disclosed. A disclosed example apparatus to recover a UAV during flight includes a tether line, a tensioner operatively coupled to the tether line, and a kite operatively coupled to the tether line to support the tether line for recovery of the UAV.

25 Claims, 8 Drawing Sheets

(56) References Cited

U.S. PATENT DOCUMENTS

| | | | |
|---|---|---|---|
| 2005/0017129 A1* | 1/2005 | McDonnell | B64D 3/00 244/110 G |
| 2009/0033098 A1 | 2/2009 | Griffith et al. | |
| 2016/0221689 A1 | 8/2016 | Tridico | |
| 2021/0171217 A1 | 6/2021 | Brown et al. | |

FOREIGN PATENT DOCUMENTS

| | | |
|---|---|---|
| WO | 0075014 | 12/2000 |
| WO | 0107318 | 2/2001 |

OTHER PUBLICATIONS

United States Patent and Trademark Office, "Non-Final Office Action," issued in connection with U.S. Appl. No. 16/707,955, dated May 25, 2022, 13 pages.

* cited by examiner

METHODS AND APPARATUS TO RECOVER UNMANNED AERIAL VEHICLES (UAVS) WITH KITES

FIELD OF THE DISCLOSURE

This disclosure relates generally to aircraft and, more particularly, to methods and apparatus to recover unmanned aerial vehicles (UAVs) with kites.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Capturing UAVs without the use of a runway enables greater flexibility in recovery locations. In particular, a UAV can be recovered in an unprepared area or on relatively smaller ships or other vessels or vehicles.

SUMMARY

An example apparatus to recover an unmanned aerial vehicle (UAV) during flight includes a tether line, a tensioner operatively coupled to the tether line, and a kite operatively coupled to the tether line to support the tether line for recovery of the UAV.

An example method of recovering a UAV during flight includes suspending a tether line via a kite, contacting the UAV with the tether line to capture the UAV, and in response to contacting the UAV with the tether line, retrieving the UAV with a tensioner operatively coupled to the tether line.

An example non-transitory machine readable medium comprises instructions, which when executed, cause a processor to at least determine a position of a UAV to be captured by a tether line, determine a position of a kite suspending the tether line, and adjust movement of at least one of the UAV or the kite to capture the UAV by the tether line.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus to recover unmanned aerial vehicles (UAVs) with kites are disclosed. Some UAVs are recovered by recovery systems, which employ a recovery tether line that is suspended vertically. In particular, a UAV contacts and/or impacts the tether line and, as a result, the UAV is decelerated and/or stopped from flight, thereby enabling recovery of the UAV without need for a runway. In some known implementations, a parachute or support beam or movable boom is used to suspend the tether line for recovery of the UAV.

Examples disclosed herein enable an effective and relatively low cost recovery of an aircraft (e.g., a UAV) via a stationary platform or a moving vehicle and/or vessel, such as a ship or vessel, for example. In particular, a kite (e.g., a parafoil kite) extends from a boat or a stationary platform and generates lift to support and/or suspend a tether line carried by a vessel, for example, to enable controlled recovery of the aircraft. The tether line, in turn, is operatively coupled to a tension device (e.g., a tensioner, a winch, a motorized winch, etc.). The tension device is implemented to retrieve the tether line along with the kite and the aircraft.

In some examples, the kite is steerable to maneuver and/or direct movement of the kite for recovery of the aircraft. In some such examples, the kite is steerable via at least one steering line. In some examples, the tension device is utilized to maintain the tether line within a pre-defined tension range and/or value prior to the aircraft contacting the tether line. Further, movement of the kite and the aircraft can be coordinated to enable capture of the aircraft via the aforementioned tether line. In some examples, the kite is suspended from a vessel, such as a ship. In other examples, however, the kite is suspended from the ground.

Figure 1:
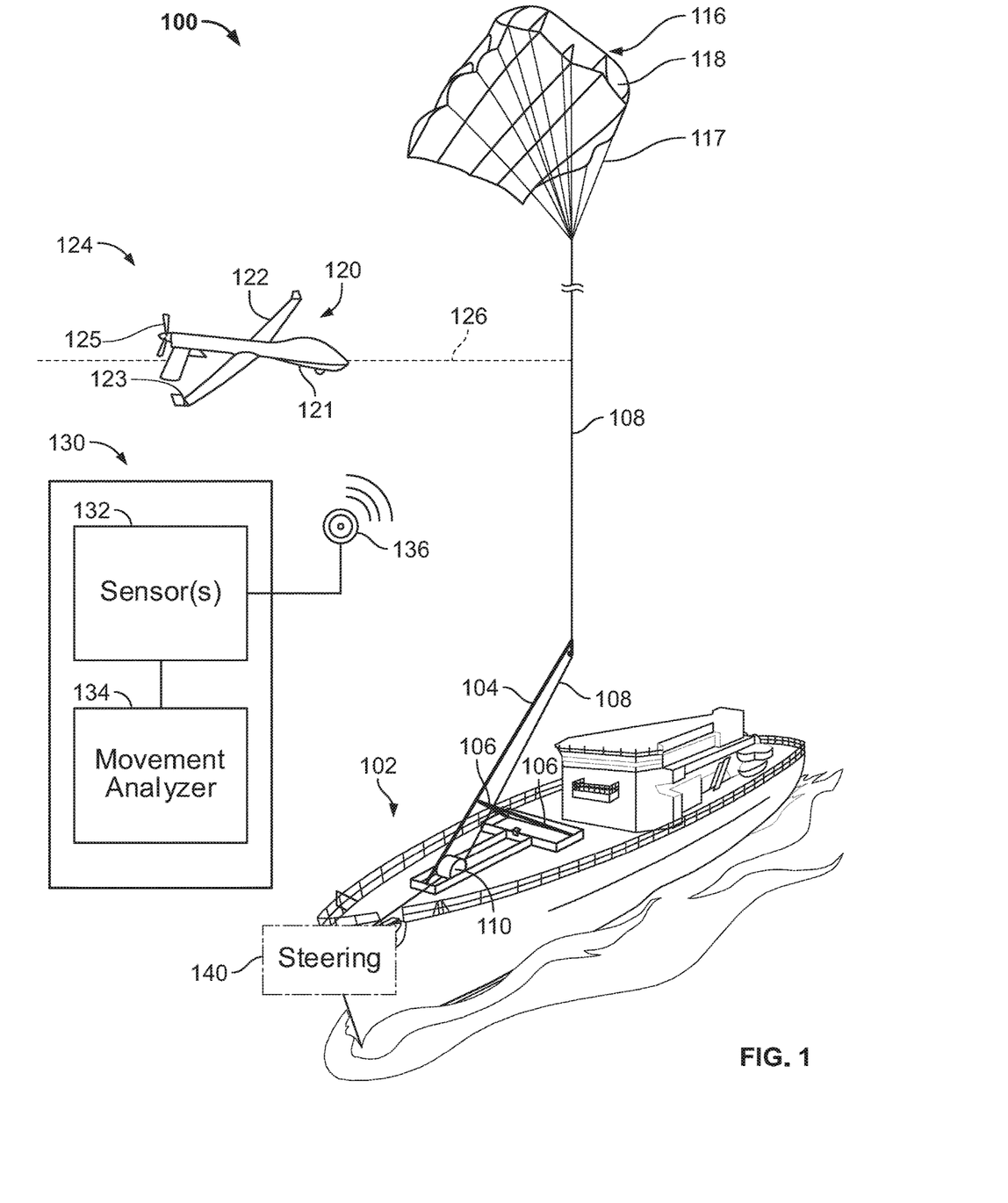
FIG. 1 depicts an unmanned aerial vehicle (UAV) recovery system in accordance with teachings of this disclosure.

FIG. 1 depicts a UAV recovery system 100 in accordance with teachings of this disclosure. The UAV recovery system 100 of the illustrated example includes a tether line control mount 102, which includes a boom (e.g., a lower tether boom, a rotatable boom, a swivel boom, a pivoting boom, etc.) 104 and boom supports 106. In the illustrated example, a tether line 108 extends from the tether line control mount 102 while a tensioner or tension device 110, which is implemented as a winch in this example, is operatively coupled to the tether line 108. Further, the tether line 108 is operatively coupled to a kite (e.g., a parafoil kite) 116 having support lines (e.g., kite lines, foil lines, etc.) 117 and a foil (e.g., a lift foil, a lift generation foil, a kite body) 118. The UAV recovery system 100 of the illustrated example is implemented to capture an aircraft 120, which is implemented as a UAV in this example. In other examples, the aircraft 120 may be implemented as another type of aircraft (e.g., a manned aircraft), spacecraft, etc.

The example UAV 120 includes a fuselage 121, wings 122 each of which includes a distal capture portion 123, and a propulsion system 124 with propellers 125. In this example, the distal capture portion 123 extends from at least one of the corresponding wings 122 generally along a direction of movement of the UAV 120. However, any appropriate type of capture or recovery mechanism can be, instead, implemented on any other portion and/or component (e.g., the fuselage 121) of the UAV 120. Further any other appropriate type of propulsion of the UAV 120 can be implemented instead.

To recover and/or capture the UAV 120 as the UAV 120 moves along a flight path 126, one of the distal capture portions 123 is brought into contact with the tether line 108 extending between the kite 116 and the tether line control mount 102. As a result, the UAV 120 is brought to a rest and remains attached to the tether line 108. In this example, the tether line 108 is suspended by the kite 116 as the kite 116 generates lift to support the tether line 108 in the air (e.g., substantially vertically in the air, within 5 degrees from vertical).

In some examples, the tensioner 110 maintains a tension of the tether line 108 extending between the tether line control mount 102 and the kite 116 within a threshold range and/or at a nominal tension value. In some examples, the kite 116 is steered to direct the tension line 108 within a requisite range of the aforementioned flight path 126. Additionally or alternatively, the kite 116 is directed toward to the flight path 126 based on a desired impact force of the tether line 108 with the distal capture portion 123.

In some examples, the UAV recovery system 100 includes a movement controller 130 which, in turn, includes at least one sensor 132, a movement analyzer 134 and a transceiver 136. In some examples, the UAV recovery system 100 includes a steering actuator 140. In some such examples, movement of the kite 116 is coordinated with movement of the UAV 120 by the movement controller 130 and the steering actuator 140. In some examples, the movement controller 130 directs movement of the steering actuator 140 and, thus, the kite 116 along with the UAV 120. In such examples, the sensor(s) 132 can detect a position, range and/or movement of the kite 116, the tether line 108 and/or the UAV 120 to enable the movement analyzer 134 to analyze the motion thereof. Based on the motion, the example movement analyzer 134 can transmit a signal to cause movement of the kite 116 and/or the UAV 120 to increase a probability that the distal capture portion 123 contacts the tether line 108, thereby facilitating recovery of the UAV 120.

Figures 2A, 2B, 2C:
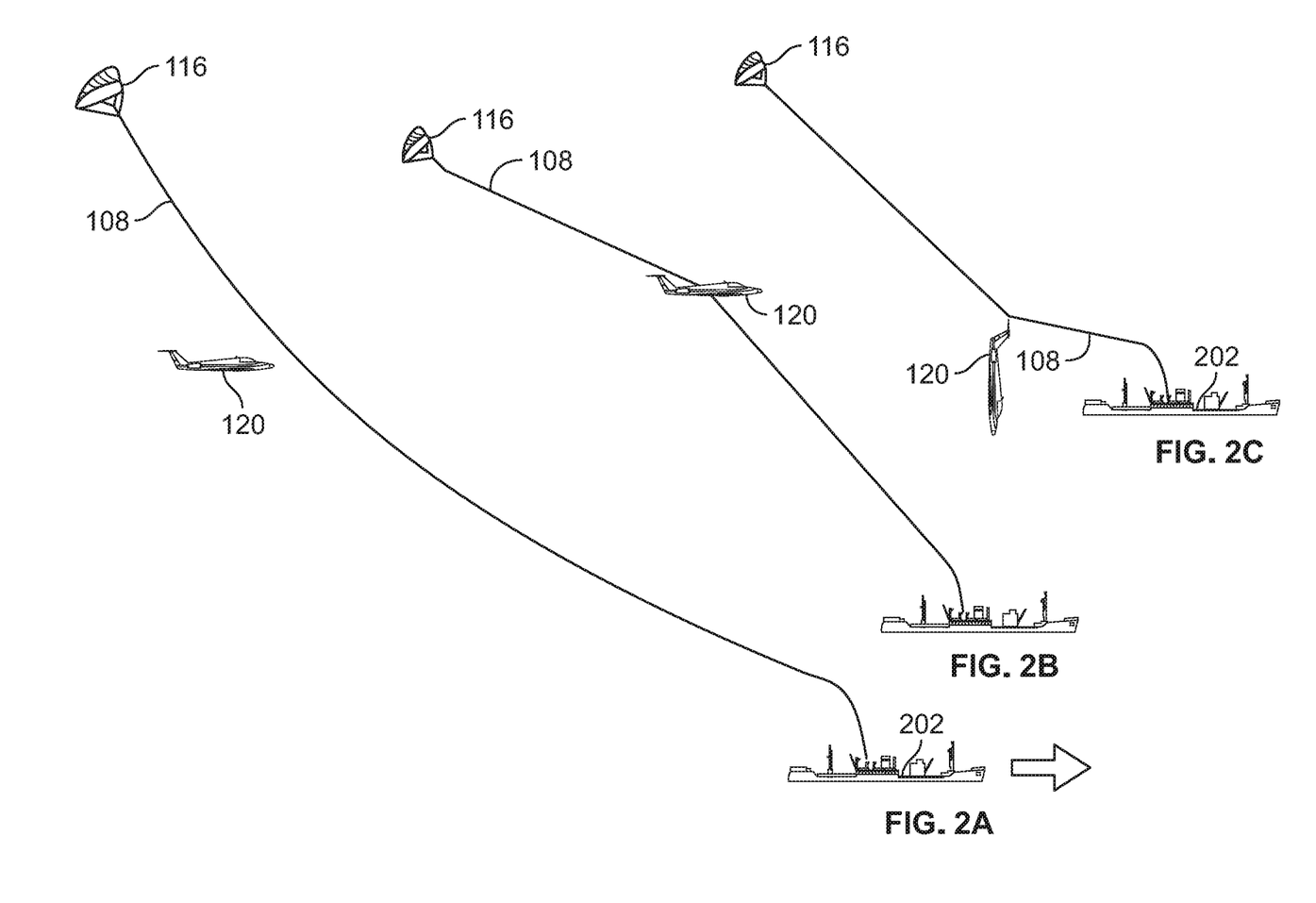
FIGS. 2A-2C depict an example recovery sequence of examples disclosed herein.

FIGS. 2A-2C depict an example recovery sequence of examples disclosed herein. FIG. 2A depicts the UAV 120 approaching the tether line 108, which extends between a vessel 202 and the kite 116. In this example, the UAV 120 is being navigated to cause the distal capture portion 123 (shown in FIG. 1) of the UAV 120 to contact the tether line 108 and, thus, decelerate the UAV 120.

Turning to FIG. 2B, the UAV 120 is shown in contact with the tether line 108. In this example, the distal portion 123 of FIG. 1 is caught on the tether line 108, thereby causing the tether line 108 along with the kite 116 to be displaced and/or moved as the UAV 120 is decelerated, thereby reducing an amount of force translated to the UAV 120. Accordingly, in this example, movement of the kite 116 causes a deceleration of the UAV 120.

FIG. 2C depicts the UAV 120 captured on the tether line 108 and being winched toward the vessel 202. In this particular example, the tension device 110 of FIG. 1 causes a motion (e.g., a reeling motion) of the tether line 108 and the UAV 120 toward the vessel 202 while the kite 116 maintains a lift force (e.g., an upward lift force in the view of FIG. 2C) to support the tether line 108. As a result, the UAV 120 is brought onto the vessel 202.

Figure 3:
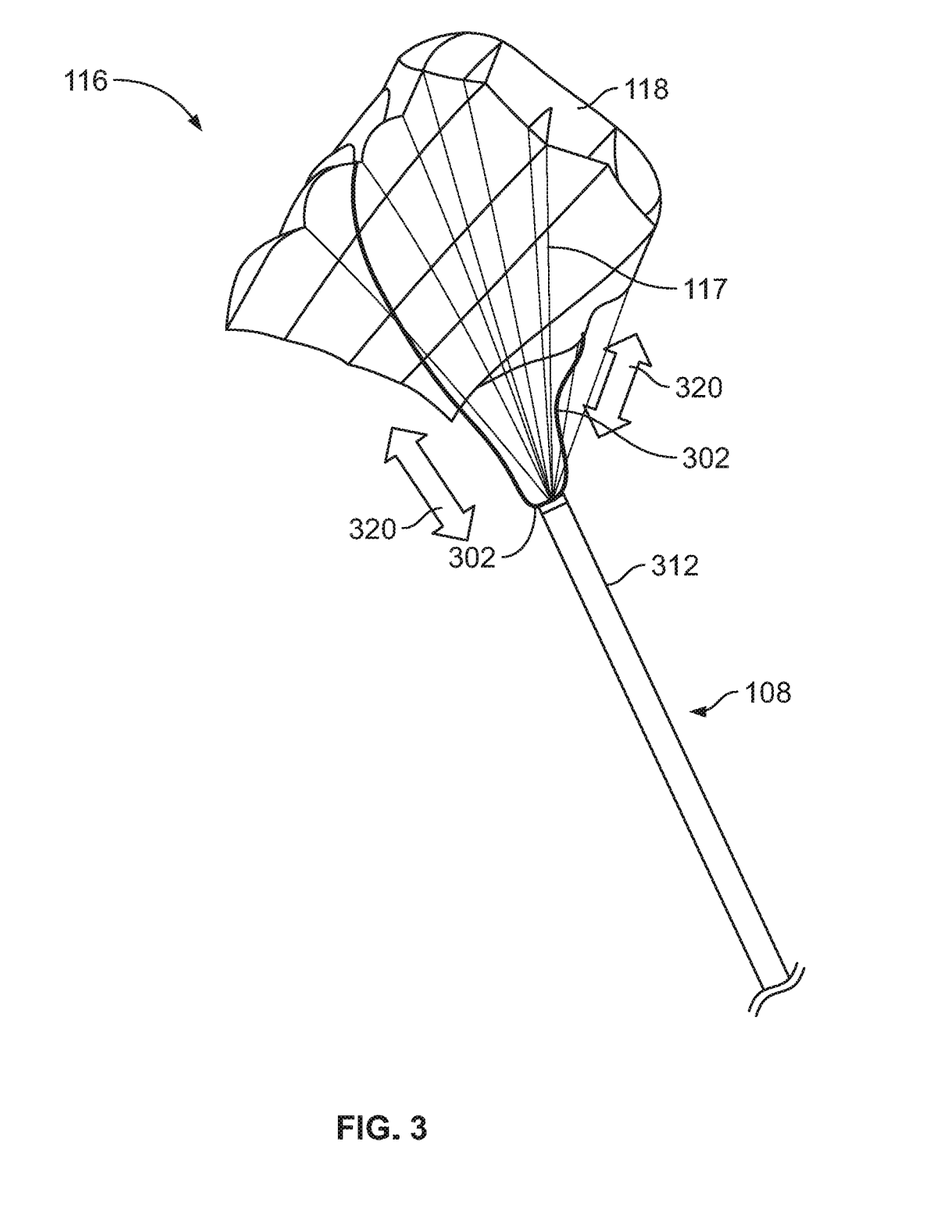
FIG. 3 is a detailed view of an example kite that can be implemented in examples disclosed herein.

FIG. 3 is a detailed view of the example kite 116 that can be implemented in examples disclosed herein. In the illustrated example, the kite 116 includes the aforementioned support lines 117, as well as the foil 118. Further, steering lines 302 are shown extending from a main cable portion (e.g., a cable bundle, a cable assembly, etc.) 312 of the tether line 108. In particular, the steering lines 302 are housed and protected within the main cable portion 312. In this example, the steering lines 302 are operatively coupled to the foil 118. However, in some other examples, a first one of the steering lines 302 is coupled to a first set of the support lines 117 while a second one of steering lines 302 is coupled to a second set of the support lines 117. In other words, the steering lines 302 can be coupled to different ones of the support lines 117 to enable controlled movement and/or steering of the kite 116. In some examples, the support lines 117 are integral with the steering lines 302.

To steer the kite 116 relative to the vessel 202 (shown in FIGS. 2A-2C) for recovery and/or capture of the UAV 120, at least one of the steering lines 302 is displaced linearly, as generally indicated by arrows 320, to re-orient the foil 118 and vary a direction of lift of the kite 116. In particular, the steering lines 302 have movable portions (e.g., calipers, movable wires, etc.) that are enclosed within at least one cable that extends through the aforementioned main cable portion 312 of the tether line 108. In other words, the steering lines 302 can be translated (e.g., linearly translated) relative to the main cable portion 312.

While two of the steering lines 302 are shown in this example, any appropriate number of the steering lines 302 can be implemented instead (e.g., one, three, four, five, six, ten, twenty, fifty, etc.). Further, any other appropriate type of steering mechanism for the kite 116 can be implemented instead.

Figure 4:
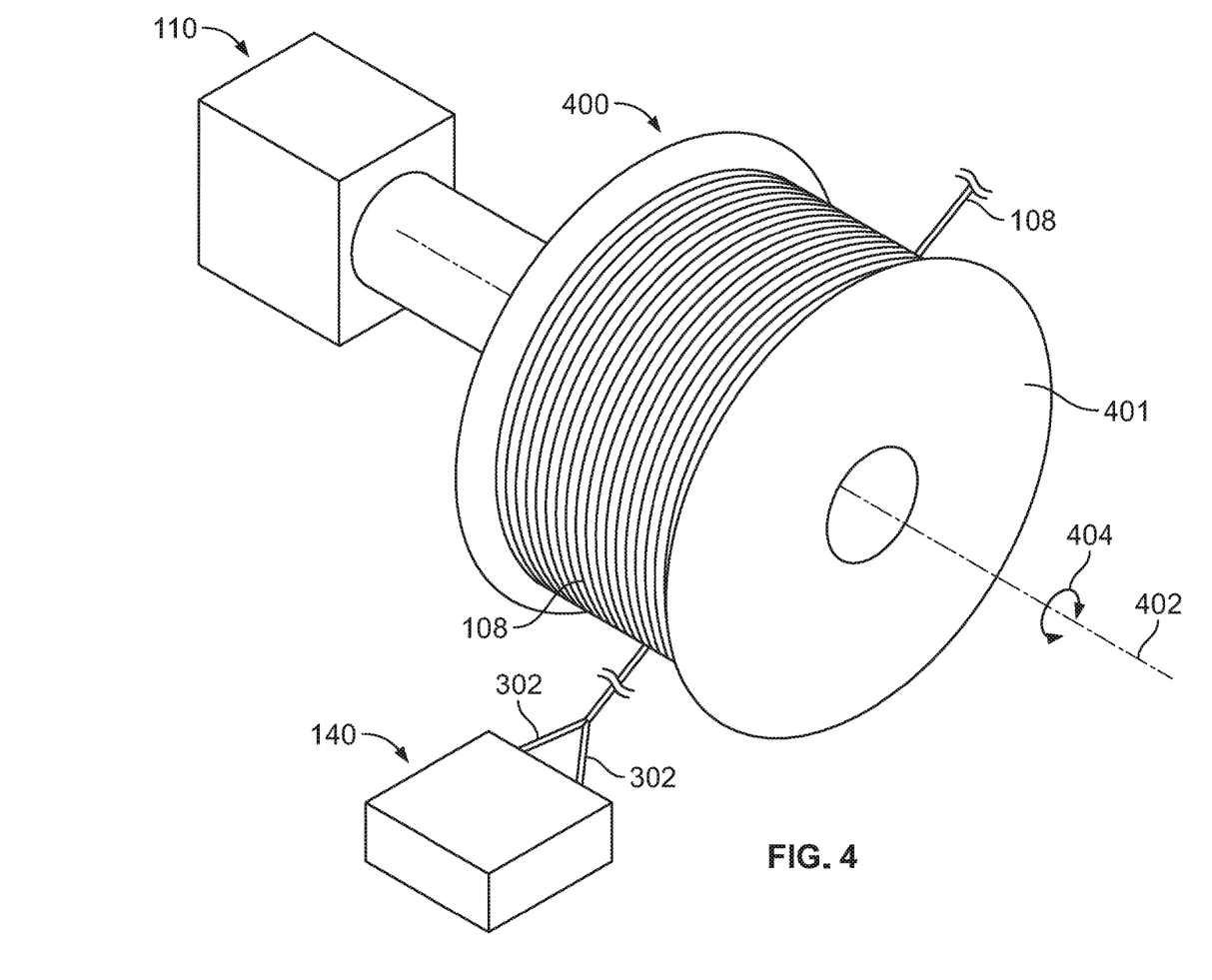
FIG. 4 depicts an example tether line spool implementation that can be implemented in examples disclosed herein.

FIG. 4 depicts an example tether line spool implementation 400 that can be implemented in examples disclosed herein. In the illustrated example of FIG. 4, the tether line 108 is depicted coiled onto a spool 401 with a portion of the tether line 108 extending from the spool 401 toward the steering actuator 140 while another portion of the tether line 108 extends toward the kite 116 (not shown).

In operation, the spool 401 is caused to rotate by the tensioner 110, which is implemented as a motorized winch in this example, about an axis (e.g., a rotational pivot axis) 402, as generally indicated by a double arrow 404. In this example, the steering actuator 140 causes movement of at least one of the steering lines 302 (e.g., a movement of a caliper of at least one of the steering lines 302) which, in turn, translates the steering lines 302 along the tether line 108 to steer the kite 116. In other words, the kite 116 can be steered from the vessel 202.

Figure 5:
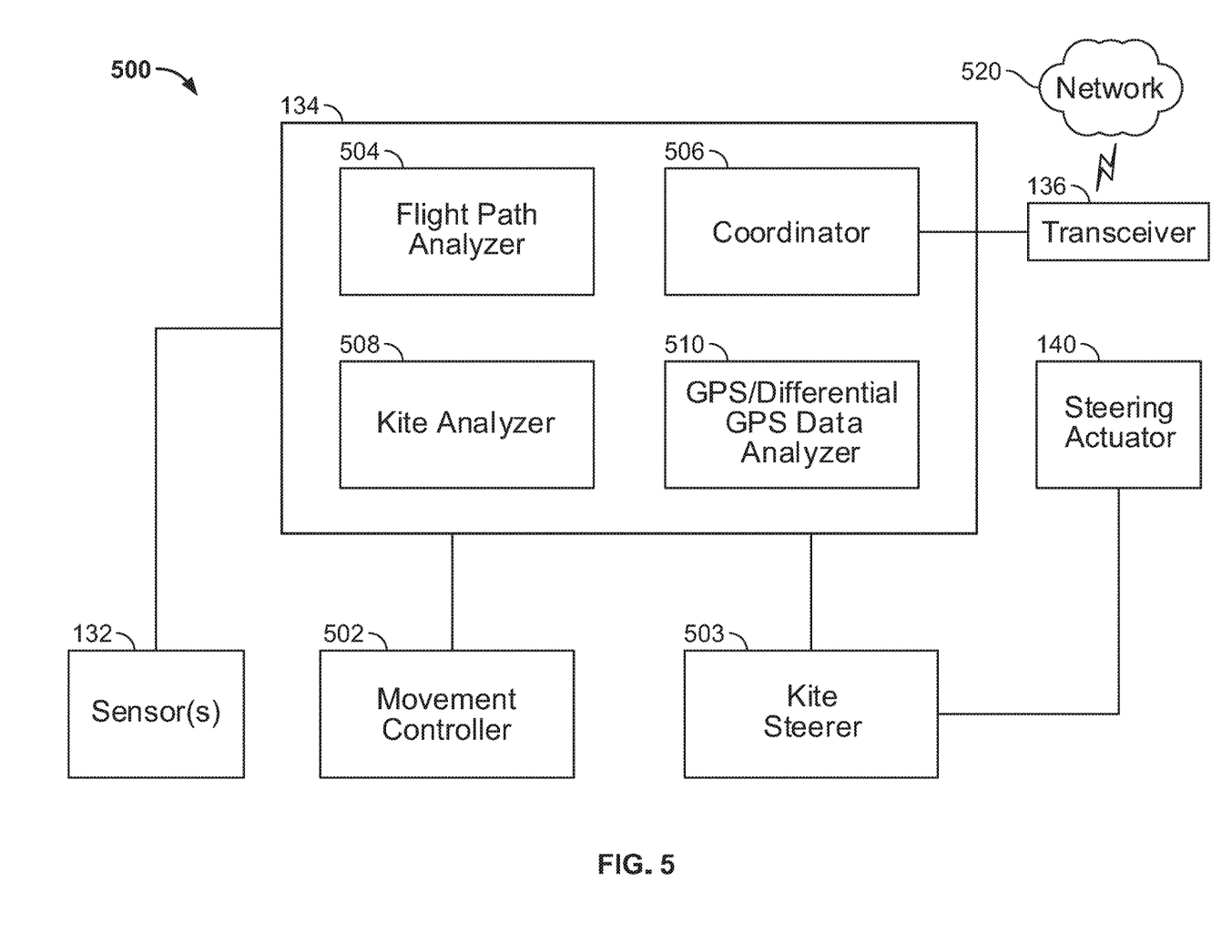
FIG. 5 is a schematic overview of a UAV recovery analysis system that can be implemented in examples disclosed herein.

FIG. 5 is a schematic overview of a UAV recovery analysis system 500 that can be implemented in examples disclosed herein. The UAV recovery analysis system 500 of the illustrated example includes the movement analyzer 134, which is operatively and/or communicatively coupled to the sensor(s) 132, the transceiver 136, a movement controller 502 and a kite steerer 503 which, in turn, is communicatively coupled to the steering actuator 140. The example movement analyzer 134 includes a flight path analyzer 504, a coordinator 506, a kite analyzer 508 and a GPS/differential GPS analyzer 510. Further, in this example, the movement analyzer 134 controls the transceiver 136, which is communicatively coupled to a network (e.g., a communication network, a navigation network, a UAV flight system network, etc.) 520.

In the illustrated example, the flight path analyzer 504 determines, estimates, interpolates and/or calculates a flight path of the UAV 120. In particular, the flight path analyzer 504 can determine an estimated flight path, trajectory and/or potential flight travel zone (e.g., a parametric flight path cone based on known flight data of the UAV 120, a potential trajectory zone or area, etc.). In some examples, the flight path analyzer 504 utilizes data from the network 520. Additionally or alternatively, the example flight path analyzer utilizes data (e.g., positional data, image data, etc.) from the sensor(s) 132 and global positioning system (GPS) or differential GPS data from the GPS/differential GPS analyzer 510.

The example coordinator 506 calculates a movement of the kite 116 and/or the UAV 120 based on the aforementioned flight path of the UAV 120 to facilitate recovery of the UAV 120 via the tether line 108. In some examples, the coordinator 506 directs movement of both the UAV 120 and the kite 116 to increase a probability that an intended portion (e.g., the distal capture portion 123) of the UAV 120 contacts the tether line 108. Additionally or alternatively, the movement coordinator 506 determines a desired contact velocity of the UAV 120 to contact the tether line 108. The desired contact velocity may be determined based on desired contact/impact force, wind speed, wind resistance, movement of the tether line 108 and/or movement of the vessel 202 (e.g., movement of the vessel 202 caused by waves and/or current).

The kite analyzer 508 of the illustrated example analyzes movement of the kite 116 to determine and/or increase a probability of recovery of the UAV 120 by the tether line 108. In this example, the kite analyzer 508 and/or the coordinator 506 directs the kite steerer 503 and, thus, the steering actuator 140 to control movement of the kite 116 based on the analyzed movement as the kite 116 generates lift to support the tether line 108.

In some examples, the GPS/differential GPS data analyzer 510 determines, predicts, interpolates and/or analyzes GPS data associated with the UAV 120. Additionally or alternatively, the GPS/differential GPS data analyzer 510 determines and/or analyzes GPS data associated with the kite 116. In some such examples, the kite 116 can include a GPS sensor and/or transponder mounted thereto.

The example movement controller 502 directs movement of the control mount 102 (e.g., pivoting, translation and/or extension of the control mount 102), and/or the tensioner 110 based on instructions from the movement analyzer 134.

In this example, the movement controller 502 controls an amount of tension in the tether line 108 for recovery of the UAV 120. In particular, the movement controller 502 controls the tensioner 110 so that the tether line 108 can be held within a desired threshold tension range and/or nominal tension value.

In the illustrated example, the kite steerer 503 controls the steering actuator 140 to direct movement of the steering lines 302 and, thus, the kite 116 based on instructions from the movement analyzer 134.

While an example manner of implementing the UAV recovery analysis system 500 of FIG. 5 is illustrated in FIG. 5, one or more of the elements, processes and/or devices illustrated in FIG. 5 may be combined, divided, re-arranged, omitted, eliminated and/or implemented in any other way. Further, the example movement controller 502, the example kite steerer 503, the example flight path analyzer 504, the example coordinator 506, the example kite analyzer 508, the example GPS/differential GPS analyzer 510 and/or, more generally, the example UAV recovery analysis system 500 of FIG. 5 may be implemented by hardware, software, firmware and/or any combination of hardware, software and/or firmware. Thus, for example, any of the example movement controller 502, the example kite steerer 503, the example flight path analyzer 504, the example coordinator 506, the example kite analyzer 508, the example GPS/differential GPS analyzer 510 and/or, more generally, the example UAV recovery analysis system 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example, movement controller 502, the example kite steerer 503, the example flight path analyzer 504, the example coordinator 506, the example kite analyzer 508, and/or the example GPS/differential GPS analyzer 510 is/are hereby expressly defined to include a non-transitory computer readable storage device or storage disk such as a memory, a digital versatile disk (DVD), a compact disk (CD), a Blu-ray disk, etc. including the software and/or firmware. Further still, the example UAV recovery analysis system 500 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
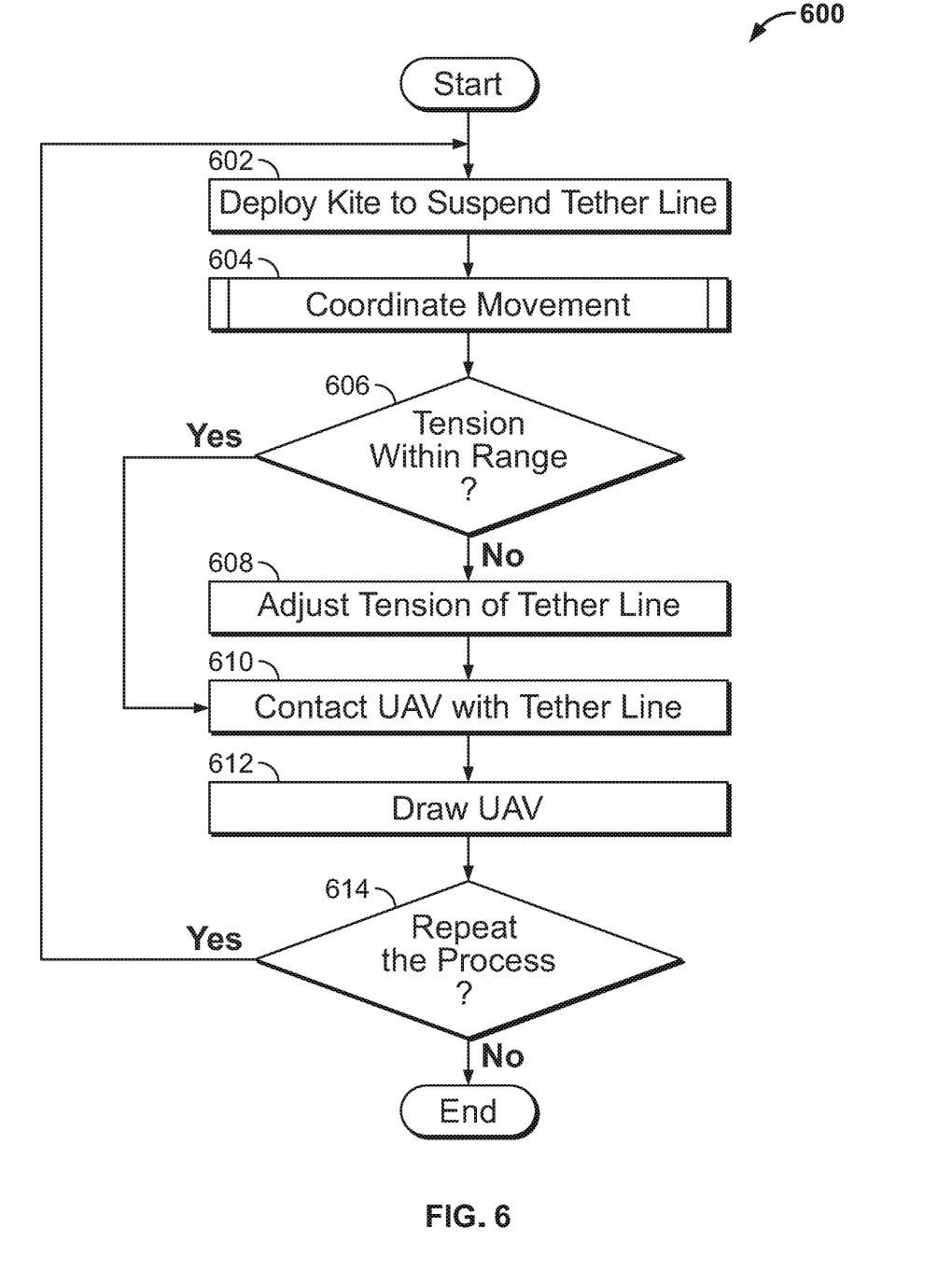
FIG. 6 is a flowchart representative of an example method to implement the example UAV recovery system of FIG. 1 and/or the UAV recovery analysis system of FIG. 5.
Figure 7:
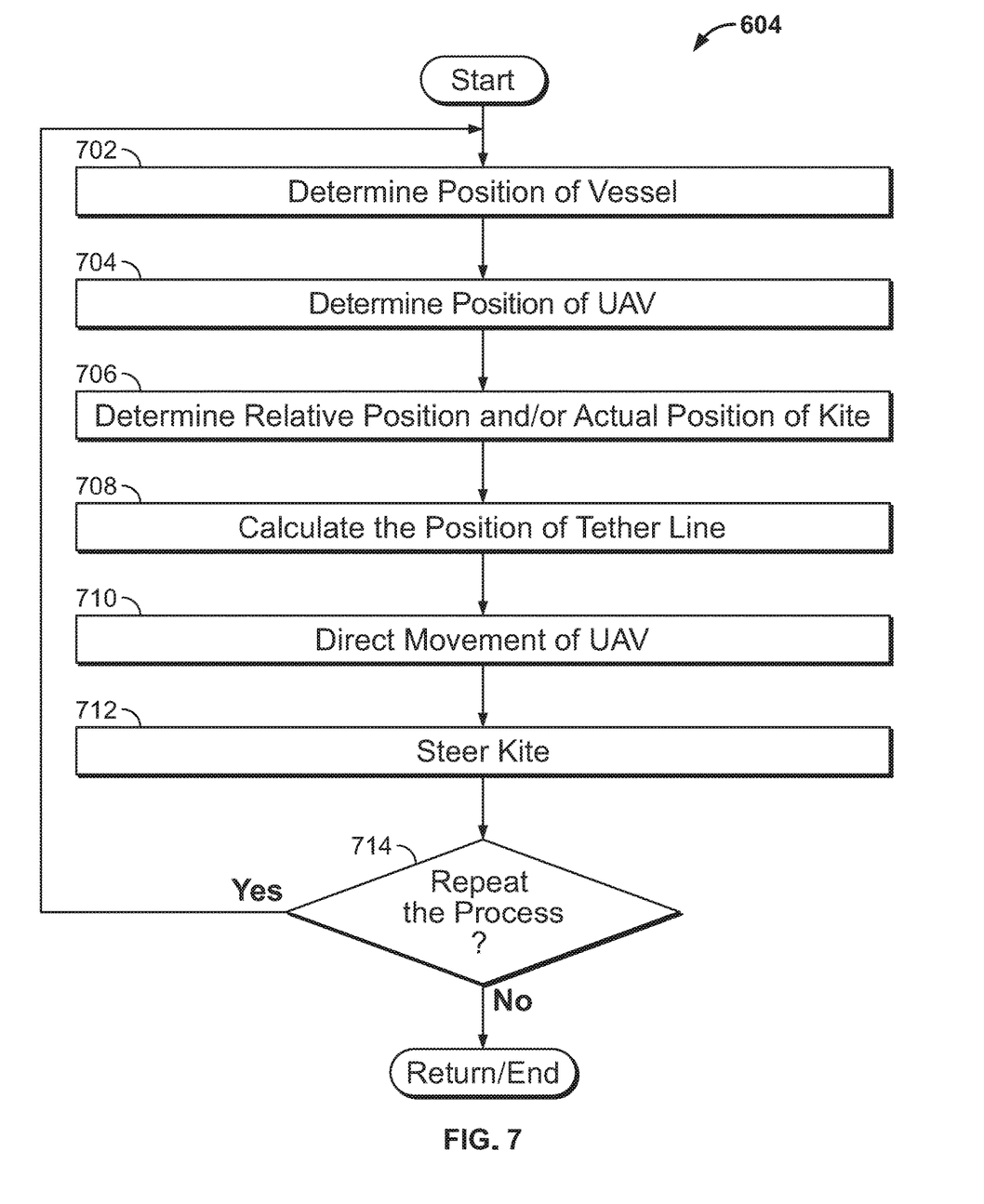
FIG. 7 is a flowchart representative of an example subroutine of the example method of FIG. 6.

Flowcharts representative of example hardware logic, machine readable instructions, hardware implemented state machines, and/or any combination thereof for implementing the UAV recovery analysis system 500 of FIG. 5 are shown in FIGS. 6 and 7. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 6 and 7, many other methods of implementing the example UAV recovery analysis system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of an example method 600 to implement the example UAV recovery system 100 of FIG. 1 and/or the UAV recovery analysis system 500 of FIG.

5. In this example, the method 600 is being performed to recover the example UAV 120 via the tether line 108.

At block 602, the kite 116 supporting the tether line 108 is deployed (e.g., deployed from the vessel 202). In this example, the coordinator 506 causes the kite 116 to be deployed and/or launched.

In some examples, at block 604, the coordinator 506 coordinates movement of the UAV 120 and/or the kite 116 to facilitate recovery of the UAV 120, as will be described in greater detail below in connection with FIG. 7.

At block 606, the movement controller 502 and/or the kite analyzer 508 determines whether a measured tension value of the tether line 108 measured by the sensor(s) 132 is within a predefined range. The range may be defined to ensure that there is adequate tension for recovery of the UAV 120 while reducing potential damage to the UAV 120 (e.g., damage from an excessive impact force). If the tension is within the predefined range (block 606), control of the process proceeds to block 610. Otherwise, the process proceeds to block 608. In some examples, the tension is determined and/or measured by the tensioner 110.

If the tension is not within the predefined range (block 606), at block 608, the movement controller 502 controls the tensioner 110 to adjust the tension within the desired tension range and the process proceeds to block 610.

At block 610, the UAV 120 is brought into contact with the tether line 108. In some examples, the coordinator 506 utilizes data from the flight path analyzer 504 to direct motion of the UAV 120 to contact the tether line 108.

At block 612, the movement controller 502 controls the tensioner 110 to pull the tether line 108 along with the UAV 120 toward the vessel 202. As a result, the UAV 120 is recovered at the vessel 202.

At block 614, it is determined whether to repeat the process. If the process is to be repeated (block 614), control of the process returns to block 602. Otherwise, the process ends. This determination may be based on whether additional ones of the UAV 120 are to be recovered.

FIG. 7 is a flowchart representative of the example subroutine 604 of the example method 600 of FIG. 6. The example subroutine 604 is implemented to enable the tether line 108 to be within a requisite distance (e.g., a proximate distance) of the UAV 120 for recovery thereof.

At block 702, the GPS/differential GPS analyzer 510 of the illustrated example determines a position of the vessel 202. In particular, the position of the vessel can be based on GPS data measured at a GPS receiver of the vessel 202.

At block 704, the coordinator 506 and/or the flight path analyzer 504 determines a relative position and/or an actual position of the UAV 120.

At block 706, additionally or alternatively, the example GPS/differential GPS analyzer 510 and/or the example kite analyzer 508 determines a position of the kite 116. The position of the kite 116 may be the actual position (e.g., in GPS coordinates) or a relative position of the kite 116 to the vessel 202 (e.g., relative to a GPS position of the vessel 202). In some such examples, a GPS receiver can be placed onto or proximate the kite 116 to determine the position of the kite 116. In some examples, a first position of the kite 116 relative to the vessel 202 and a second position of the vessel 202 (e.g., a measured GPS position of the vessel 202) are utilized (e.g., summed) to calculate a third position of the kite 116 (e.g., an actual position of the kite 116).

At block 708, in some examples, a position of the tether line 108 is determined by the kite analyzer 508. In some such examples, the kite analyzer 508 may determine a 3-D positional displacement and/or overall displacement of the tether line 108 (e.g., displacement curvature along different portions of the tether line 108) as the tether line 108 extends from the vessel 202.

At block 710, the example coordinator 506 directs movement of the UAV 120 toward the tether line 108. For example, the coordinator 506 may transmit movement instructions and/or positional coordinates to the UAV 120 by signals transmitted from/to the transceiver 136 and/or the network 520. In some examples, the coordinator 506 causes the transceiver 136 to transmit the position of the kite to the UAV 120.

At block 712, in some examples, the kite analyzer 508 directs the kite steerer 503 to move the steering actuator 140 to steer the kite 116. In particular, the kite 116 can be moved along with the tether line 108 to increase a probability that the UAV 120 will contact the tether line 108.

At block 714, it is then determined whether to repeat the process. If the process is to be repeated, control of the process returns to block 702. Otherwise, the process ends/returns. This determination may be based on whether the tether line 108 or the kite 116 is within a requisite range of a flight path (e.g., a projected flight path, an interpolated flight path, a projected light zone area, etc.) of the UAV 120 or a determined position of the UAV 120.

Figure 8:
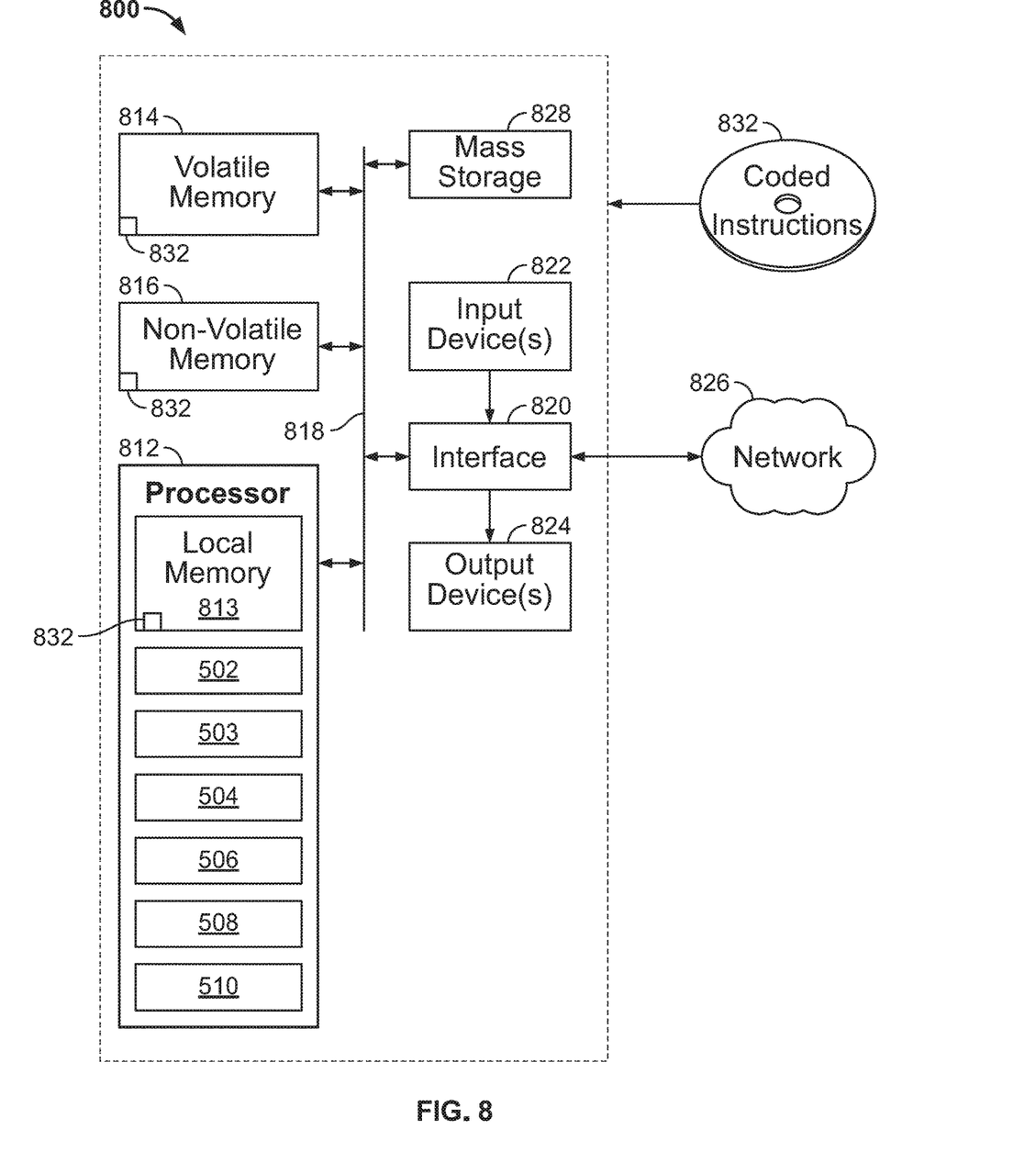
FIG. 8 is a block diagram of an example processing platform structured to execute the instructions of FIGS. 6 and 7 to implement examples disclosed herein.

FIG. 8 is a block diagram of an example processor platform 800 structured to execute the instructions of FIGS. 6 and 7 to implement the UAV recovery analysis system 500 of FIG. 5. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example movement controller 502, the example kite steerer 503, the example flight path analyzer 504, the example coordinator 506, the example kite analyzer 508, and the example GPS/differential GPS analyzer 510.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and 7 may be stored in the mass storage device 828, in the volatile memory 814, in the non-volatile memory 816, and/or on a removable non-transitory computer readable storage medium such as a CD or DVD.

Example 1 includes an apparatus to recover an unmanned aerial vehicle (UAV) during flight. The apparatus includes a tether line, a tensioner operatively coupled to the tether line, and a kite operatively coupled to the tether line to support the tether line for recovery of the UAV.

Example 2 includes the apparatus as defined in example 1, where the kite includes a parafoil kite.

Example 3 includes the apparatus as defined in examples 1 or 2, where the tether line includes a first steering line and a second steering line, the first and second steering lines operatively coupled to the kite to steer the kite.

Example 4 includes the apparatus as defined in any of examples 1 to 3, further including a sensor to measure a first position of the kite relative to a vessel from which the tether line extends.

Example 5 includes the apparatus as defined in example 4, further including a kite analyzer to calculate a second position of the kite based on the first position and a third position of the vessel.

Example 6 includes the apparatus as defined in example 5, further including a transceiver to transmit the calculated position of the kite to the UAV or a navigation network associated with the UAV.

Example 7 includes the apparatus as defined in any of examples 4-6, where the vessel includes a ship.

Example 8 includes the apparatus as defined in any of examples 1-7, where the tensioner is to maintain the tether line within a desired tension range prior to contact of the UAV with the tether line.

Example 9 includes a method of recovering a UAV during flight. The method includes suspending a tether line via a kite, contacting the UAV with the tether line to capture the UAV, and in response to contacting the UAV with the tether line, retrieving the UAV with a tensioner operatively coupled to the tether line.

Example 10 includes the method as defined in example 9, further including maintaining, via the tensioner, a tension of the tether line within a desired tension range prior to contact of the UAV with the tether line.

Example 11 includes the method as defined in examples 9 or 10, further including coordinating, via instructions executed by at least one processor, movement of the UAV for the UAV to contact the tether line.

Example 12 includes the method as defined in example 11, further including determining, via instructions executed by the at least one processor, a first position of the kite relative to a vessel carrying the tether line.

Example 13 includes the method as defined in example 12, further including calculating, via instructions executed by the at least one processor, a second position of the kite based on the determined first position and a third position of the vessel.

Example 14 includes the method as defined in example 13, further including steering the kite based on the determined position of the kite and a flight path of the UAV.

Example 15 includes the method as defined in example 14, where steering the kite includes controlling first and second steering lines extending through the tether line.

Example 16 includes the method as defined in any of examples 9-15, further including determining, via instructions executed by at least one processor, a position of the tether line.

Example 17 includes a non-transitory machine readable medium comprises instructions, which when executed, cause a processor to at least determine a position of a UAV to be captured by a tether line, determine a position of a kite suspending the tether line, and adjust movement of at least one of the UAV or the kite to capture the UAV by the tether line.

Example 18 includes the non-transitory machine readable medium as defined in example 17, where the instructions cause the processor to move the kite via at least one steering line to bring the tether line proximate a flight path of the UAV.

Example 19 includes the non-transitory machine readable medium as defined in examples 17 or 18, where the position of the kite is determined based on a position of the kite relative to a vessel from which the tether extends.

Example 20 includes the non-transitory machine readable medium as defined in example 19, where the instructions cause the processor to direct movement of the UAV based on the position of the kite.

From the foregoing, it will be appreciated that example methods, apparatus and articles of manufacture have been disclosed that provide an effective and relatively low cost manner of recovering a UAV. Examples disclosed herein can also be used to effectively adjust a position of a recovery tether line with a flight path of the UAV, thereby accounting for numerous variables (e.g., movement of a recovery vessel, winds, etc.) that can affect recovery of the UAV.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of UAVs, examples disclosed herein can be implemented in any appropriate type of vehicle (e.g., spacecraft, watercraft, etc.) and/or other types of aircraft (e.g., manned aircraft).

The following claims are hereby incorporated into this Detailed Description by this reference, with each claim standing on its own as a separate embodiment of the present disclosure.

What is claimed is:

1. An apparatus to recover an unmanned aerial vehicle (UAV) during flight, the apparatus comprising:
    a tether line;
    first and second steering lines;
    a tensioner operatively coupled to the tether line;
    a kite operatively coupled to the tether line to support the tether line for recovery of the UAV, the first and second steering lines operatively coupled to the kite;
    a sensor to detect a position of the UAV ire flight, the sensor remotely positioned from the UAV;
    at least one memory,
    machine readable instructions; and
    at least one processor to execute the machine readable instructions to:
        calculate a projected flight path of the UAV based on the detected position of the UAV, and
        cause, based on the calculated projected flight path, an actuator to linearly displace at least one of the first or second steering lines to steer the kite toward the UAV for recovery thereof.

2. The apparatus as defined in claim 1, wherein the kite includes a parafoil kite.

3. The apparatus as defined in claim 1, wherein the sensor is a first sensor, and further including a second sensor to measure a first position of the kite relative to a vessel from which the tether line extends.

4. The apparatus as defined in claim 3, wherein the at least one processor is to execute the machine readable instructions to calculate a second position of the kite based on the first position of the kite and a position of the vessel supporting the apparatus.

5. The apparatus as defined in claim 4, further including a transceiver to transmit the calculated second position of the kite to the UAV or a navigation network associated with the UAV.

6. The apparatus as defined in claim 3, wherein the vessel includes a ship.

7. The apparatus as defined in claim 1, wherein the tensioner is to maintain the tether line within a desired tension range prior to contact of the UAV with the tether line.

8. The apparatus as defined in claim 1, wherein each of the first and second steering lines includes a movable wire or caliper.

9. The apparatus as defined in claim 1, further including a third steering line operatively coupled to the kite.

10. The apparatus as defined in claim 1, wherein the first and second steering lines are independently linearly displaced from one another relative to a main cable portion from which the first and second steering lines extend.

11. The apparatus as defined in claim 1, wherein the tether line is coupled to the kite at a first end of the tether line and coupled to a fixed point at a second end of the tether line opposite the first end.

12. The apparatus as defined in claim 11, wherein the fixed point corresponds to a ground-based structure.

13. The apparatus as defined in claim 11, wherein the fixed point corresponds to a ship.

14. The apparatus as defined in claim 1, wherein the at least one processor is to execute the instructions to further calculate relative positions of portions of the tether line relative to the flight path, and wherein the actuator is caused to linearly displace the at least one of the first or second steering lines at least partially based on the relative positions of the portions of the tether line.

15. A method of recovering an unmanned aerial vehicle (UAV) during flight, comprising:
    suspending a tether line via a kite having first and second steering lines operatively coupled thereto;
    detecting, via a sensor remote from the UAV, a position of the UAV in flight;
    calculating, by executing instructions with at least one processor, a projected flight path of the UAV based on the position of the UAV;
    steering, via an actuator, the kite toward the UAV by linearly displacing at least one of the first and second steering lines operatively coupled to the kite based on the projected flight path of the UAV;
    contacting the UAV with the tether line to capture the UAV; and
    in response to contacting the UAV with the tether line, retrieving the UAV with a tensioner operatively coupled to the tether line.

16. The method as defined in claim 15, further including maintaining, via the tensioner, a tension of the tether line within a desired tension range prior to contact of the UAV with the tether line.

17. The method as defined in claim 15, further including coordinating, by executing instructions with the at least one processor, movement of the UAV for the UAV to contact the tether line.

18. The method as defined in claim 17, further including determining, by executing instructions with the at least one processor, a first position of the kite relative to a vessel carrying the tether line.

19. The method as defined in claim 18, further including calculating, by executing instructions with the at least one processor, a second position of the kite based on the determined first position of the kite and a position of the vessel.

20. The method as defined in claim 19, further including steering the kite based on the determined first position of the kite and the projected flight path of the UAV.

21. The method as defined in claim 15, further including determining, by executing instructions with the at least one processor, a position of the tether line.

22. A non-transitory machine readable medium comprising instructions, which when executed, cause at least one processor to at least:
    determine a first position of an unmanned aerial vehicle (UAV) to be captured by a tether line based on information from a sensor remote to the UAV;
    calculate a projected flight path of the UAV based on the first position;
    determine a second position of a kite suspending the tether line;
    cause, based on the projected flight path and the second position, the kite to be steered toward the UAV by directing an actuator to linearly displace at least one of a first steering line or a second steering line, the first and second steering lines operatively coupled to the kite; and adjust movement of at least one of the UAV or the kite to capture the UAV by the tether line.

23. The non-transitory machine readable medium as defined in claim 22, wherein the actuator is directed to move the kite to bring the tether line proximate the projected flight path of the UAV.

24. The non-transitory machine readable medium as defined in claim 22, wherein the second position of the kite is determined based on a position of the kite relative to a vessel from which the tether extends.

25. The non-transitory machine readable medium as defined in claim 24, wherein the instructions cause the processor to direct movement of the UAV based on the second position of the kite.

\* \* \* \* \*